(12) United States Patent
Cheng et al.

(10) Patent No.: US 6,183,860 B1
(45) Date of Patent: Feb. 6, 2001

(54) MAGNETIC RECORDING MEDIA HAVING CRMO UNDERLAYERS

(75) Inventors: Yuanda Cheng, San Jose, CA (US); Xingbo Yang, Phoenix, AZ (US); Yancy Song, Fremont, CA (US)

(73) Assignee: Stormedia, Inc., Santa Clara, CA (US)

( * ) Notice: Under 35 U.S.C. 154(b), the term of this patent shall be extended for 0 days.

(21) Appl. No.: 09/072,415

(22) Filed: May 4, 1998

(51) Int. Cl.[7] ....................................... B32B 5/16
(52) U.S. Cl. .................. 428/336; 427/131; 427/132; 428/332; 428/694 TS; 428/900; 428/928
(58) Field of Search .................................... 427/131, 132; 428/336, 332, 694 TS, 900, 928

(56) References Cited

U.S. PATENT DOCUMENTS 5,900,324 * 5/1999 Moroishi et al. .................... 428/611

* cited by examiner

*Primary Examiner*—Bernard Pianalto
(74) *Attorney, Agent, or Firm*—Townsend Townsend & Crew LLP; Mark D. Barrish, Esq.

(57) ABSTRACT

A magnetic recording media having a CrMo underlayer provides improved performance characteristics. In one embodiment, the recording media comprises a rigid substrate and an underlayer disposed over the substrate, in which the underlayer comprises CrMo. Preferably, the Mo crystals in the CrMo underlayer are at least about 140 Å in the film growth direction for the 002 crystal plane. Advantageously, recording media with such a 002 crystal size, when used in conjunction with a magnetic layer, such as CoCrTaPtNi, exhibits significantly higher parametric qualities than underlayers using other materials. Typically, Mo in the range between about 7% and 16% in the CrMo alloy, more preferably between about 9% and 11%, will provide the recited 002 crystal size.

9 Claims, 9 Drawing Sheets

Sample #23  25 nm

Sample #25  25 nm

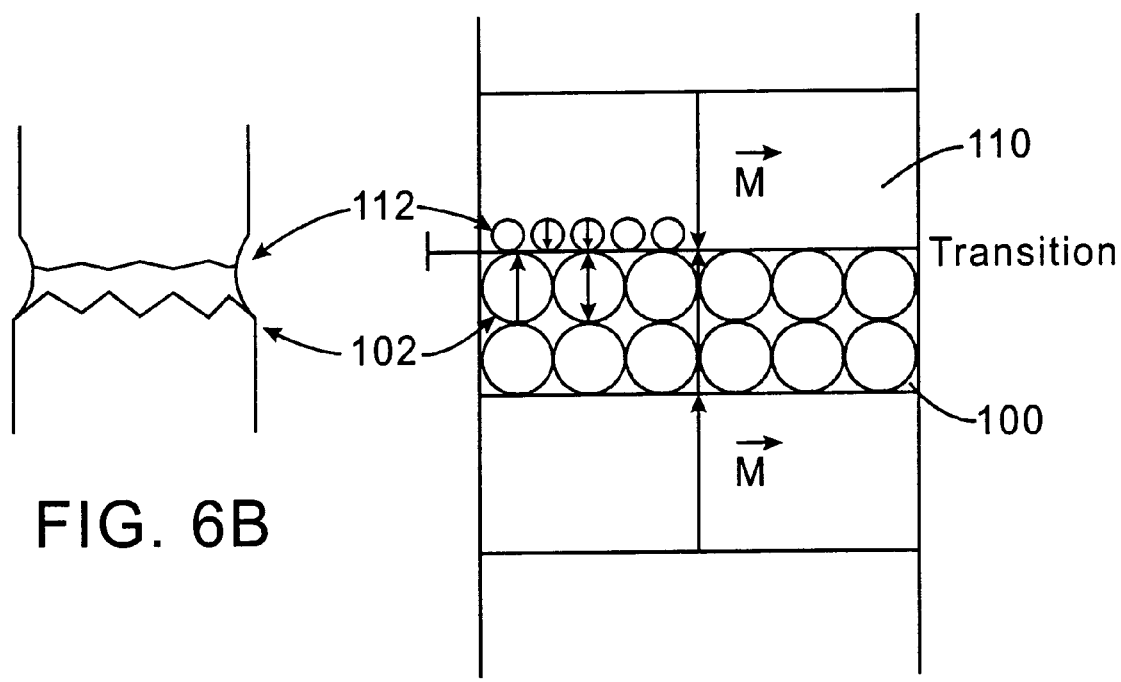
FIG. 6B
FIG. 6A
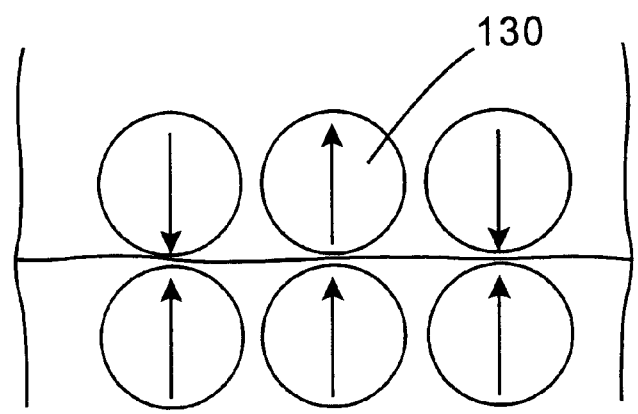
FIG. 6C

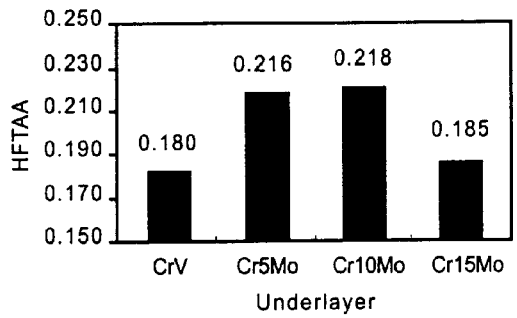 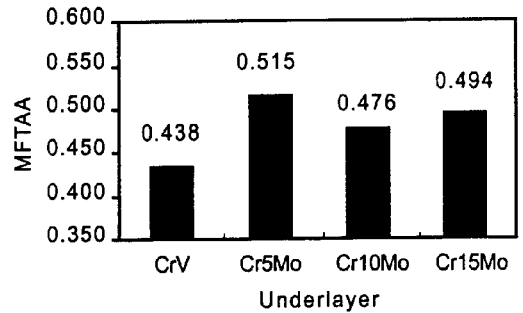
FIG. 7A    FIG. 7B
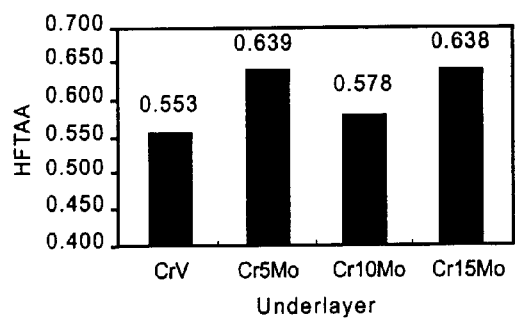
FIG. 7C

MAGNETIC RECORDING MEDIA HAVING CRMO UNDERLAYERS

BACKGROUND OF THE INVENTION

The present invention relates generally to magnetic recording media, and more particularly to high density magnetic recording disks having improved recording characteristics.

Thin film magnetic recording disks generally comprise a disk substrate having a magnetic layer and a number of underlayers and overlayers deposited thereon. The nature and composition of each layer is selected to provide the desired magnetic recording characteristics, as generally recognized in the industry. An exemplary present day thin film disk is illustrated in FIG. 1 and comprises a non-magnetic disk substrate 10, typically composed of aluminum or an aluminum alloy. An amorphous nickel-phosphorus (NiP) layer 12 is formed over each surface of the disk substrate 10, typically by plating. The NiP layer is hard, and imparts rigidity to the aluminum substrate. A second underlayer in the form of a chromium ground layer 14 is formed over the NiP layer 12, typically by sputtering, and a magnetic layer 16 is formed over the ground layer 14. The magnetic layer 16 comprises a thin film of a ferromagnetic material, such as a magnetic oxide or magnetic alloy. Usually, a protective layer 18, such as carbon film, is formed over the magnetic layer 16, and a lubricating layer 20 is formed over the protective layer.

The presence of the NiP layer 12 and the chromium ground layer 14 have been found to improve the recording characteristics of the magnetic layer 16. In particular, a chromium ground layer formed over a NiP layer has been found to provide enhanced coercivity and reduced noise characteristics. Additionally, the NiP layer is often mechanically textured to create a roughened surface prior to formation of the chromium ground layer. This surface texturing has a substantial effect on the mechanical properties of the disk and its interaction with the recording transducer (read/write head), which typically "flies" over the disk surface on a cushion of air that is moved by the rotating disk. In particular, texturizing is highly beneficial to the magnetic recording system's ability to reliably withstand repeated starting and stopping of the disk, with its associated repeated contact between the read/write head and the disk's surface. The texturing may be circumferential, crosswise, or separated into start/stop and data zones, with the preferred geometry depending on the particular composition of the cobalt-containing magnetic layer, and on the specific disk drive design.

Such magnetic recording constructions have been very successful and allow for relatively high recording densities. As with all successes, however, it is desired to provide magnetic recording disks having even higher recording densities. To increase recording densities beyond those of known practical magnetic recording media, it would be beneficial to promote certain types of crystal growth in the magnetic recording layer within the structure of the magnetic recording media.

For this reason, it is desirable to have improved recording media having underlayers made of specific materials that promote improved performance in the magnetic layer of the recording media. It would be particularly desirable if such improved magnetic recording media were readily fabricated using existing thin film deposition and texturing equipment. It is also desirable if the underlayer further enhances the magnetic properties of recent cobalt-containing magnetic layers.

SUMMARY OF THE INVENTION

The present invention is directed to improved magnetic recording media. The underlayer used in the structure of magnetic recording media can effect the epitaxial crystal growth in the overlying magnetic recording layer, and the underlayer can be chosen to increase certain desired characteristics in the bulk magnetics and parametrics of the recording media. Specifically, certain materials in the underlayer promote a smaller grain size and a more equally spaced crystal distribution in the magnetic layer which generally increases the performance of the magnetic layer.

The present invention provides magnetic recording media comprising a rigid substrate and an underlayer disposed over the substrate, in which the underlayer comprises a chromium molybdenum (CrMo) alloy. A magnetic layer is disposed over this underlayer, and is also disposed over a texturized surface. Generally, the substrate comprises aluminum, and an NiP layer is disposed over the substrate and below the underlayer. Preferably, the crystals in the CrMo underlayer are oriented with the (002) crystal plane parallel to the surface of the substrate. Additionally, the (002) crystal size in a film growth direction is at least about 140 Å. The large crystal size is believed to facilitate epitaxial growth of the overlying magnetic layer. Advantageously, recording media with such a (002) crystal orientation, when used with a magnetic layer such as CoCrTaPtNi, exhibit significantly higher parametric qualities than underlayers using other materials. These improved parametric qualities will allow the recording media to have higher recording densities.

Typically, Mo in the range between about 7% and 16% (atomic percent) in the CrMo alloy, more preferably between about 9% and 11%, will provide the recited (002) crystal orientation and preferred lattice constant for a better epitaxial growth with Co-alloy. Most preferably, underlayers will have about 10% Mo by atomic percent (Cr10Mo). It is believed that CrMo underlayer defines a surface that promotes evenly distributed epitaxial growth of Co crystals in the magnetic layer. The surface may also minimize the lateral crystal grain size of Co crystals in the magnetic layer. Preferably, the magnetic layer has Co crystals between about 60–150 Å in lateral crystal size. These characteristics of the magnetic layer improve the performance characteristics of the resulting recording media.

A further understanding of the nature and advantages of the invention may be realized by reference to the remaining portions of the specification and the drawings.

BRIEF DESCRIPTION OF THE DRAWINGS

FIGS. 6A, 6B and 6C are overhead views of crystal orientation in one track of a magnetic recording media.

FIGS. 7, 8, 9, 10, 11, 12 and are bar charts comparing various parametric qualities for recording media using a CoCrTaPtNi magnetic layer and underlayers comprising CrV, Cr5Mo, Cr10Mo, and Cr15Mo, respectively.

DETAILED DESCRIPTION OF THE SPECIFIC EMBODIMENTS

Figure 1:
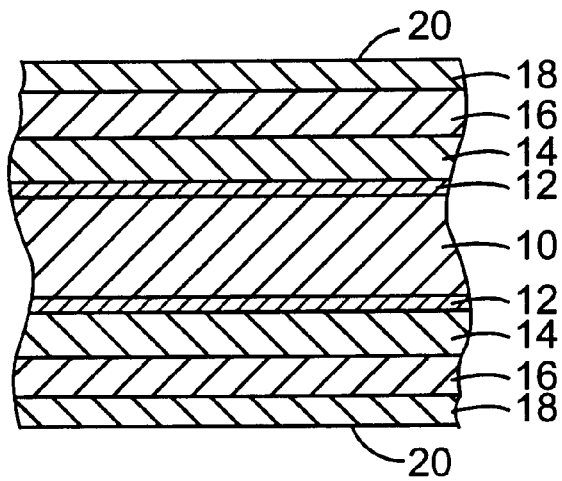
FIG. 1 is a cross-sectional view of a prior art recording media.
Figure 2:
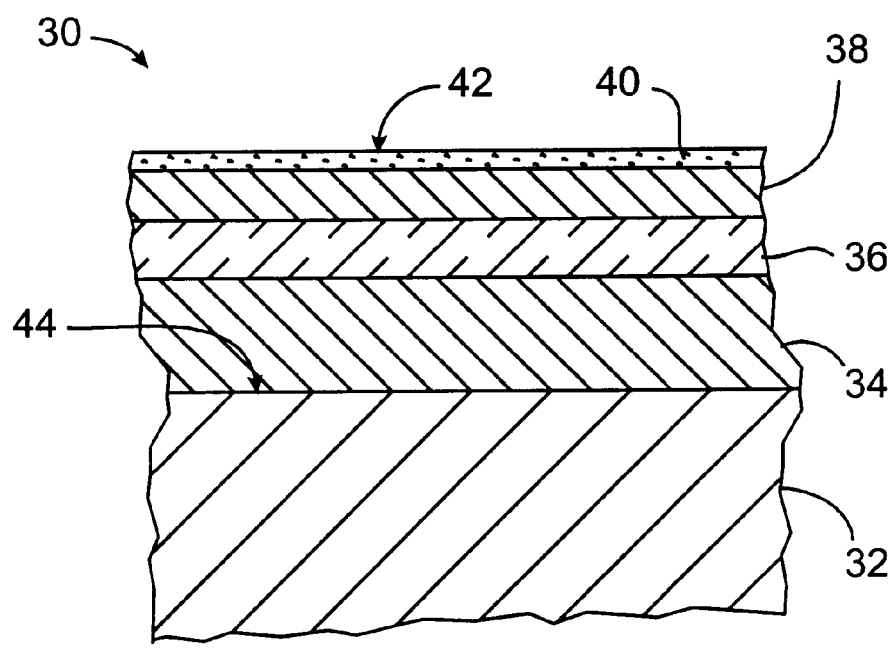
FIG. 2 is a cross-sectional view of a recording media according to the principals of the present invention.

Referring now to FIG. 2, magnetic recording media according to the present invention will usually be in the form of a magnetic recording disk 30 comprising an aluminum alloy substrate 32, an NiP layer 34, an underlayer 36 (generally comprising chromium, titanium, and preferably either copper or vanadium) a magnetic layer 38, a protective layer 40, and a lubricating layer 42. The various layers will be formed over at least one surface of the substrate 32, and preferably over both surfaces of the substrate, analogous to the structure illustrated in FIG. 1. A textured surface 44 may be disposed below magnetic layer 38, typically being imposed on the NiP layer 34.

Substrate 32 comprises a disk having a diameter and thickness suitable for formation of a conventional hard magnetic recording media. Typically, substrate 32 will be composed of aluminum or an aluminum alloy. Alternatively, nonmetallic substrates comprising glass, ceramic, carbon, glass-ceramic composites, glass-carbon composites, silicon, silicon carbide, and the like, may be used.

NiP layer 34 will preferably be formed over the surface of the substrate using conventional plating techniques, ideally by means of electroless plating. The NiP layer will be deposited to a thickness generally in the range from about 500 Å to 5000 Å. Alternatively, though not necessarily preferably, the NiP layer 34 may be formed using more expensive vacuum deposition techniques.

Once the NiP layer 34 has been formed over the substrate, the NiP layer can be mechanically textured in a conventional manner, often by means of tape or slurry abrasion. The type of texturing will depend, in part, on the nature of the magnetic alloy which is to be applied over NiP layer 34. For example, some magnetic alloys, such as cobalt chromium tantalum, benefit from circumferential texturing to achieve optimum coercivity and magnetic characteristics.

Other magnetic alloys, including cobalt platinum chromium, are enhanced by alternative types of texturing. A particularly advantageous texture and a method for its production are described in co-pending U.S. patent application Ser. No. 08/503,785, now U.S. Pat. No. 5,798,164, the full disclosure of which is incorporated herein by reference. That exemplary texture comprises independently optimized texture zones for 1) data, and 2) read/write recording head contact.

An underlayer 36 is typically formed over NiP layer 34 to provide a surface for facilitating epitaxial growth of certain crystal structures in the magnetic layer 38. In a preferred embodiment, the underlayer 36 includes a chromium molybdenum (CrMo) alloy. With a balance comprising of chromium, the underlayer 36 has between about 6% and 20% of molybdenum by atomic percentage, preferably between about 7 and 16%, and most preferably between about 9 and 11%. Although not restricted in this manner, the underlayer 36 is usually between about 400 to 800 Å thick.

Figure 3A:
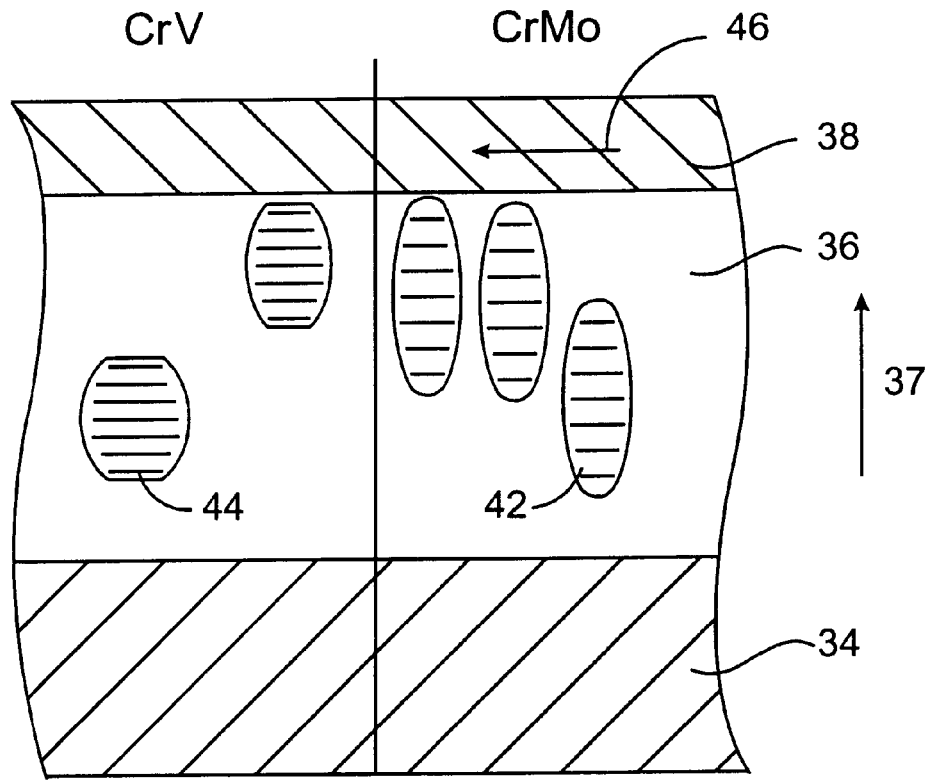
FIG. 3A is a cross-section view of a magnetic recording media showing crystals in the underlayer of the media for CrV and CrMo.
Figure 3B:
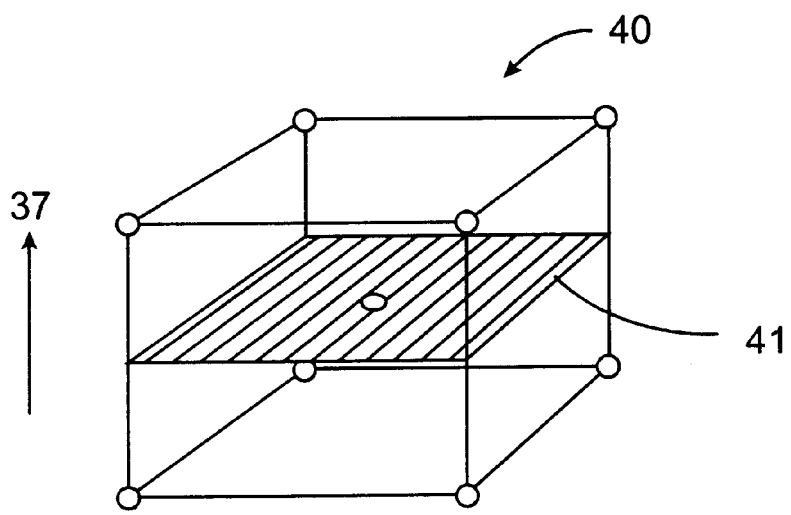
FIG. 3B shows a body center cubic crystal structure and the (002) crystal plane.

Referring to FIGS. 3A–3B, empirical evidence has shown that for underlayers 36 having body-centered cubic (BCC) crystal structure, such as CrMo, it is desirable to maximize the growth of crystal size or grain size in the film growth direction as indicated by arrow 37 for the (002) crystal plane (FIG. 3A). For a body-center-cubic crystal lattice 40, the (002) orientation refers to the crystal plane 41 shown in FIG. 3B. Preferably, the 002 crystal plane is parallel to the surface of the substrate. The film growth direction is the direction in which the 002 crystal planes are stacked (i.e. film thickness grows), which in this embodiment is the vertical direction indicated by arrow 37.

Referring back to FIG. 3A, the underlayer 36 having the larger (002) crystal size in the film growth direction 37, promotes desired epitaxial crystal growth in the overlying magnetic layer 38. FIG. 3A compares the size of crystals 42 in the Cr10Mo underlayer versus the crystals 44 in the Cr20V underlayer. As can be seen, the crystals 42 in the Cr10Mo underlayer are noticeably larger.

Figure 4:
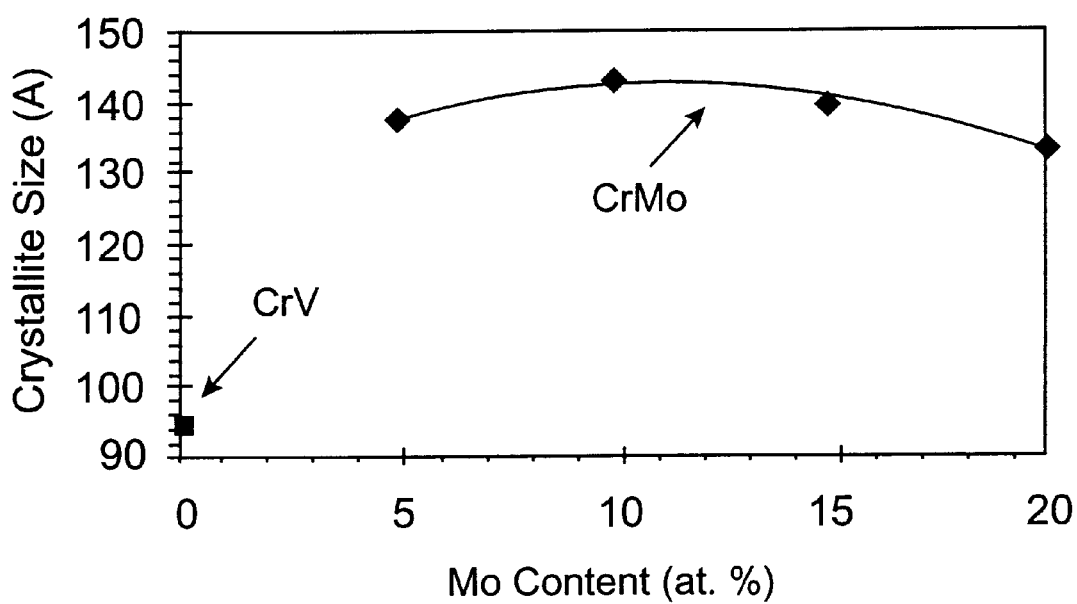
FIG. 4 shows the 002 crystal size in underlayers comprising CrV, Cr5Mo, Cr10Mo, and Cr15Mo, respectively.

Advantageously, large CrMo crystal size in the film growth direction 37 of the underlayer 36 promotes an in-plane orientation of the c-axis 46 of Co crystals in the overlying magnetic layer 38 (FIG. 3A). This is particularly desirable. Co crystals have a hexagonal-closed-packed (HCP) crystal structure and it is preferred that the $11\bar{2}0$ plane be in the film growth direction (vertical for this embodiment). Positioning the c-axis 46 in an in-plane orientation improves the parametric magnetic quality of the magnetic layer. The vertical crystal size 44 in underlayers such as Cr20V is significantly smaller (FIGS. 3A and 4).

As the magnetic layer 38 generally mimics the underlayer, the crystal structure in the underlayer 36 influences the resulting magnetic layer. Referring to FIG. 4, underlayer 36 comprising chromium and molybdenum has a maximum (002) orientation crystal size in the film growth direction when the underlayer 36 has about 10% molybdenum by atomic percentage. As shown in the figure, when the amount of molybdenum is increased or decreased from the 10% mark, the film growth direction (002) crystal size is undesirably decreased. For the present invention, it is preferred that Mo content exists between about 7 and 16% molybdenum by atomic weight. This corresponds to a crystal size above about 140 Å in the film growth direction 37.

Figure 5A:
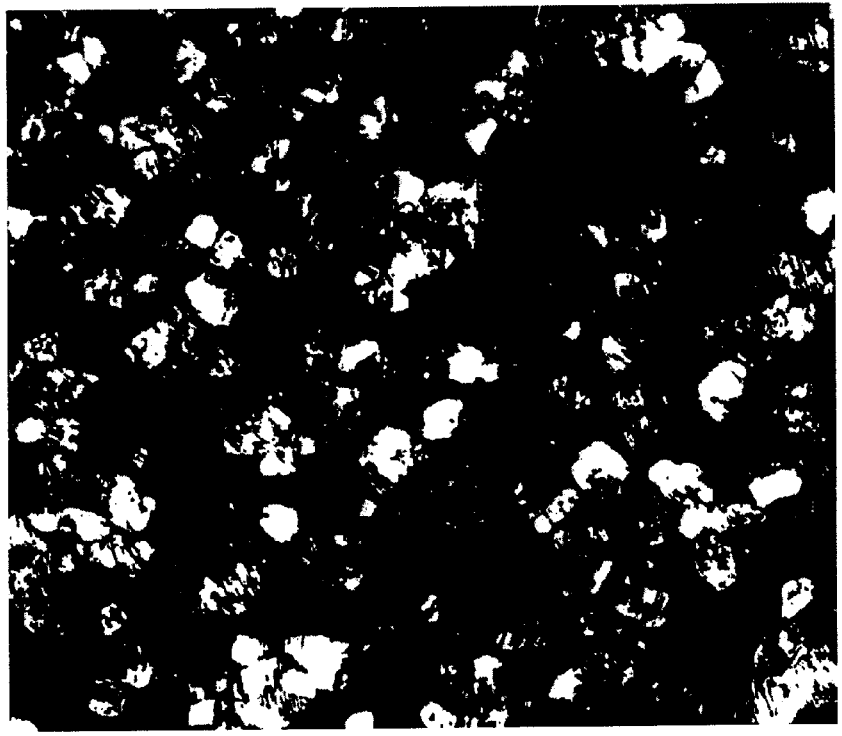
FIGS. 5A–5B show the Co crystals in the magnetic layer over underlayers of Cr10Mo and Cr20V, respectively.
Figure 5B:
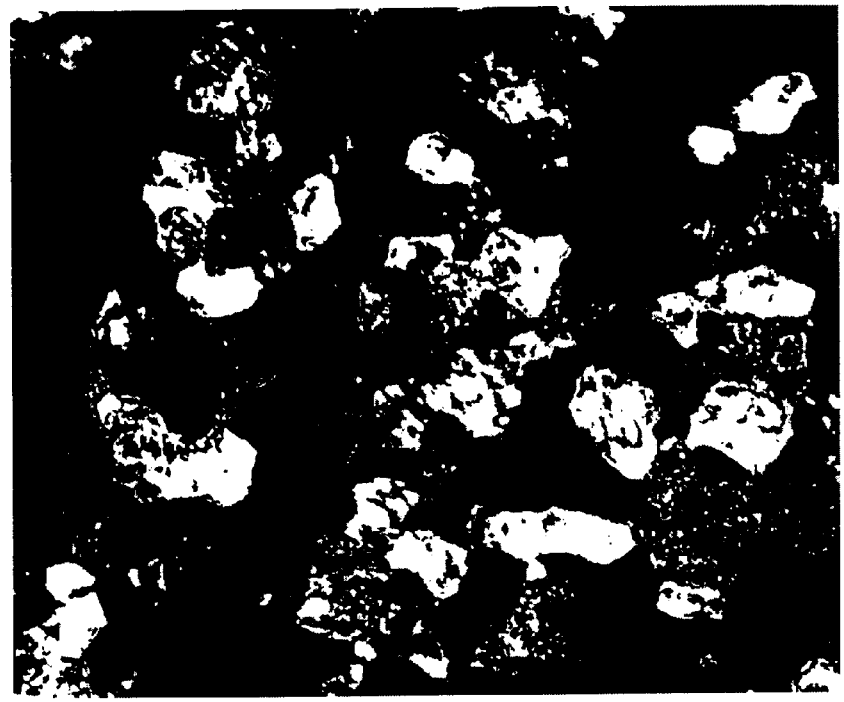
Figure 8:
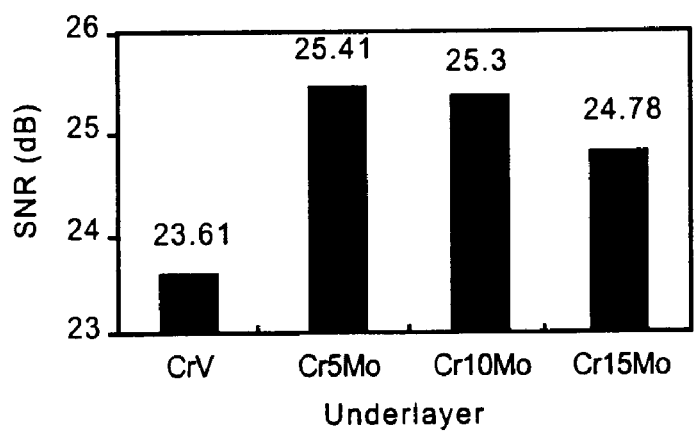
Figure 9:
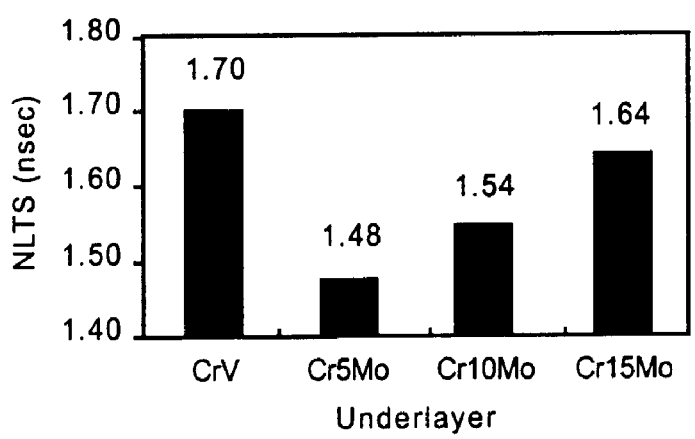

It is also particularly beneficial that the large vertical crystal size of Cr10Mo in the underlayer 36 also reduces the horizontal Co crystal size in the magnetic layer 38. Crystal size in the lateral direction is better when smaller. By reducing lateral crystal size in the magnetic layer, signal-to-noise ratio of the resulting recording media is improved. This is due in part to the reduced lateral crystal size and improved segregation between crystals. As shown in FIGS. 5A–5B, the Co crystals in the magnetic layer 38 over a Cr10Mo underlayer (FIG. 5A) have a horizontal or lateral crystal size substantially smaller than the same crystal orientation in Cr20V (FIG. 5B). Crystals in FIG. 5A range in size from about 60–150 Å in lateral size. Preferably, the crystals are between about 60–100 Å in lateral crystal size. The Co crystals in the magnetic layer 38 over the Cr10Mo underlayer are also noticeably more segregated.

Smaller lateral crystal size creates a more distinct magnetic boundary or transition between areas as shown by FIG. 6A–6C. The larger crystals of region 100 has a more jagged boundary 102. The smaller crystals of region 110 has a straighter, more defined boundary 112. Crystal grain-to-grain segregation also reduces crystal coupling which could cause an adjacent crystal 130 to change orientations unintentionally (FIG. 6C). This creates a less distinct transition and reduces signal quality. The sharper the transition, the better.

The magnetic layer 38 is applied over the underlayer 36, again typically by sputtering in a conventional manner. These magnetic recording layers have magnetic recording characteristics which are generally advantageous for high density recording media. The magnetic layer may comprise CoCrPtB, CoPtCr, CoNiCr, or other cobalt-containing alloys. Preferably, magnetic layer 38 comprises CoCrNiTaPt. The layer is typically about 200 Å thick between about 3%–6% Ni, 10%–18% Cr, 4%–6% Ta, and 3%–10% Pt, with the remainder Co. The Cr content may range between about 14%–18%, 14%–16% atomic percent. The Pt may range between about 3–8%, more preferably 3–6% atomic percent. In an exemplary embodiment, the magnetic layer has about 3% Ni, 14% Cr, 6% Ta, and 3% Pt, with the remainder Co. The thickness of the magnetic layer 38 is not critical, typically being in the range from about 100 Å to about 1000 Å. Preferably, the crystals are evenly distributed and enhance the magnetic characteristics of the layer 38. The preferred crystal structure in the magnetic layer 38 has a c-axis 46 in the in-plane direction, uniform and small grain size, and grain-to-grain segregation. Large crystal size in the film growth direction (as noted by arrow 37 of FIG. 3A) provides a growth surface for facilitating epitaxial growth of the magnetic layer.

A protective layer 40 is next formed over the magnetic layer 38, typically being composed of carbon sputtered to a thickness in the range from about 50 Å to about 200 Å; a thickness of over 100 Å being slightly preferred. The protective layer will usually be coated with a lubricant layer 42, for example, a fluorinated polyether or the like, typically having a thickness in the range from about 10 Å to about 20 Å. An alternative protective overcoat and method for its deposition are described in co-pending U.S. patent application Ser. No. 08/761,336, filed Dec. 10, 1996, now U.S. Pat. No. 5,858,477, the full disclosure of which is incorporated herein by reference.

The following example is offered by way of illustration, not by way of limitation.

EXPERIMENTAL

Conventional NiP-coated aluminum disk substrates were prepared with either a full surface texture or a zone texture, as described above. The textured disks were 95 mm in diameter and 30.5 mil thick. A series of direct comparisons between media structures having a Cr10Mo underlayer with similar media structures having different percentages of Cr and Mo underlayer and a CrV underlayer were performed. The specific underlayers used in the tests were CrMo, in which Mo provided between 5.0–15.0% of the underlayer (all percentages being atomic percent), and CrV in which V provided about 20.0% of the underlayer, respectively.

A sputtering machine was set up to apply heat of about 250–350° C. to each side of the textured substrate. The underlayer was then sputtered at a pressure of between 2 and 12 mTorr, with a bias of between −100 and −250 volts. Sputtering of the underlayer was followed by sputtering of the magnetic layer at a pressure of 2 to 12 mTorr, also with a bias of between −100 and −250 volts. An initial carbon coating was sputtered over the magnetic layer in a 5.0–20.0% methane, $H_2$, or $N_2$ environment. The disks were then cooled and the remainder of the carbon layer was sputtered in a 10.0–30.0% $N_2$ environment.

As can be seen by examining FIGS. 5–13, the bulk magnetics and parametrics of the resulting recording media are noticeably better for the CrMo underlayers as compared to the conventional CrV underlayer. There is, specifically, an unexpected spike in performance for those underlayers 36 containing about 10% Mo.

For example, the effects of the differing underlayer materials in recording parametrizes such as high, medium and low frequency track average amplitude (LFTAA) are illustrated in FIGS. 5–7. As can be seen from this data, the high frequency track average amplitude (HFTAA) is significantly better for Cr5Mo and Cr10Mo as compared to the conventional Cr20V. The CrMo underlayers are also considerably better than conventional Cr20V underlayers for signal-to-noise ratio and non-linear transition shift performance (FIGS. 8–9), where it is understood that higher signal-to-noise ratios and lower non-linear transition shifts are desirable.

Figure 10:
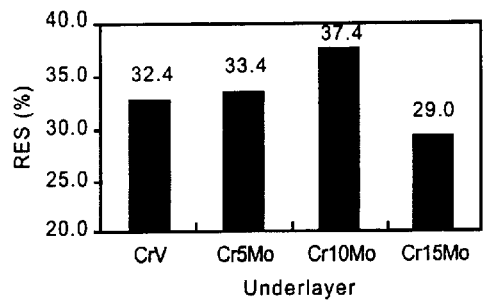
Figure 11:
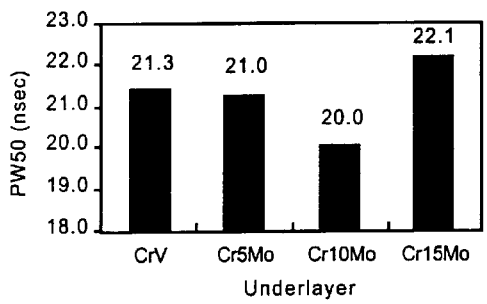
Figure 12:
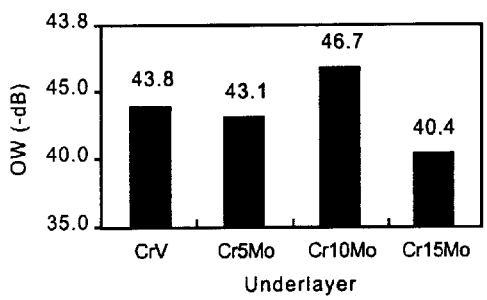
Figure 13:
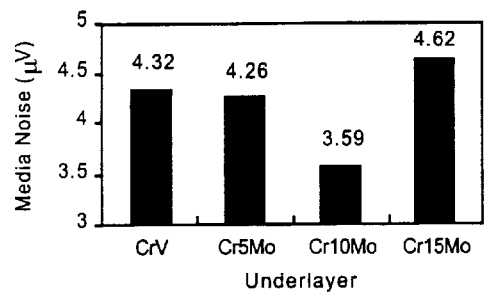

Finally, it should be noted that for parametric qualities, such as resolution shown in FIG. 10 (where a higher value is more desirable, pulse width shown in FIG. 11 (where a smaller value indicating a sharper transition is desirable), overwrite shown in FIG. 12 (where a larger value is desirable), and media noise shown in FIG. 13 (where a smaller value is more desirable), recording media having CrMo underlayers generally perform better or at least equivalent to conventional Cr20V underlayer. A chromium underlayer with about 10% molybdenum (Cr10Mo) underlayer performed remarkably better in all categories as compared to the conventional CrV underlayer.

Figure 14:
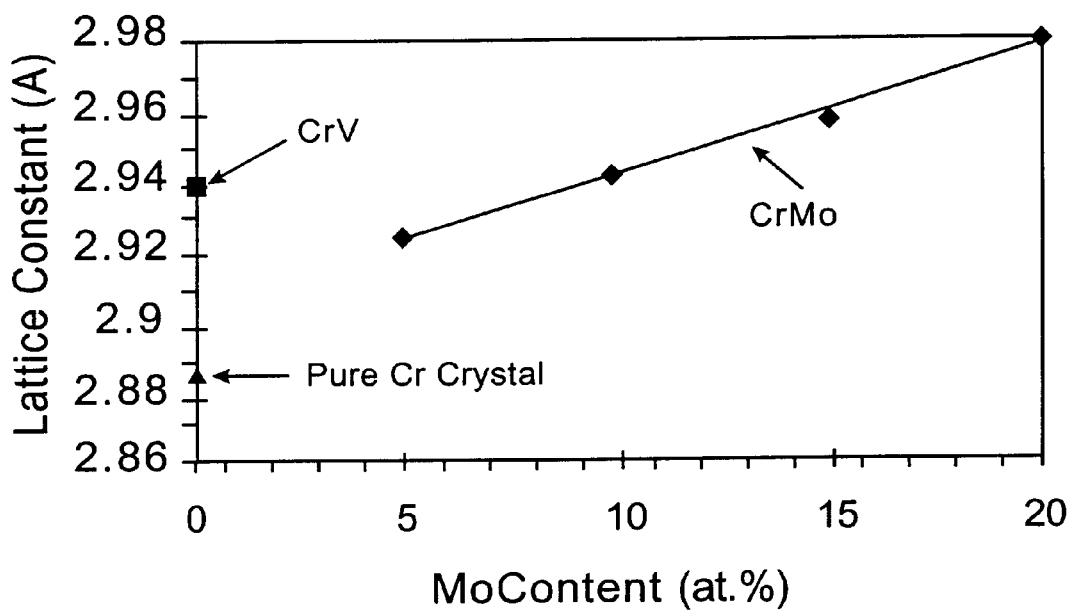
FIG. 14 shows the lattice constants for underlayers comprising CrV, Cr5Mo, Cr10Mo, and Cr15Mo, respectively.

As can be seen in FIG. 4, Cr10Mo has the largest vertical 002 orientation crystal size of about 144 Å. Correspondingly, the best or nearly the best parametric performance in the resulting magnetic recording media occur with a Cr10Mo underlayer. The Cr10Mo underlayer also has a lattice constant essentially equivalent to the lattice constant for CrV (FIG. 14). Conventional theory would suggest that underlayers with similar lattice constants would result in magnetic layers of similar parametric qualities. It is believed, however, that the significantly larger (002) crystal size enables the Cr10Mo underlayer to facilitate the epitaxial growth of desired crystal structures and crystal structure distribution in the overlying magnetic layer. Furthermore, the large vertical crystal size also unexpectedly reduced lateral CO crystal size in the overlying magnetic layer 38, improving the performance of the recording media. Thus, the Cr10Mo underlayer has improved magnetic qualities as demonstrated in FIGS. 5–13.

Although the foregoing invention has been described in some detail by way of illustration and example, for purposes of clarity and understanding, it will be obvious that certain changes and modifications may be practiced within the scope of the appended claims.

What is claimed is:

1. Magnetic recording media comprising:

a rigid substrate;

an underlayer disposed on the substrate; and a magnetic layer disposed on the underlayer, wherein the magnetic layer comprises magnetic layer crystals disposed on a textured surface;

wherein the underlayer comprises Cr and Mo, wherein CrMo crystals in a film growth direction have a crystal size of at least about 140 A, the CrMo crystal size operating to promote an in-plane orientation of a c-axis of the magnetic layer crystals of the magnetic layer.

2. Magnetic recording of claim 1 wherein the surface has a circumferential texturing.

3. Magnetic recording media comprising:

a rigid substrate;

an underlayer disposed on the substrate, the underlayer comprising materials selected from the group consisting of Cr and Mo; and a magnetic layer disposed on the underlayer, wherein the magnetic layer is disposed on a textured surface;

wherein the magnetic layer has Co crystals between about 60–150 A, wherein the Co crystals are segregated to reduce Co crystal to Co crystal coupling in the magnetic layer.

4. Magnetic recording media comprising:

a rigid substrate;

a magnetic layer; and an underlayer disposed between the substrate and the magnetic layer, the underlayer comprising Cr and Mo, wherein CrMo crystals in a film growth direction have a crystal size of at least about 140 A.

5. Magnetic recording of claim 4 wherein the CrMo crystals reduce crystal grain size in the magnetic layer.

6. Magnetic recording of claim 4 wherein the CrMo crystals improve crystal grain-to-grain segregation in the magnetic layer.

7. Magnetic recording of claim 4 wherein the magnetic layer has a thickness between about 100–100 A.

8. Magnetic recording media comprising:

a rigid substrate;

a magnetic layer; and an underlayer disposed between the substrate and the magnetic layer, the underlayer comprising materials selected from the group consisting of Cr and Mo;

wherein the magnetic layer has Co crystals between about 60–150 A.

9. Magnetic recording media comprising:

a rigid substrate;

a magnetic layer; and an underlayer disposed between the substrate and the magnetic layer, the underlayer is between about 400–800 A in thickness and includes about 10% Mo by atomic percent, with the balance comprising of Cr;

wherein the magnetic layer is about 200 A in thickness and includes about 14% Cr, 6% Ta, 3% Pt, and 3% Ni, by atomic percent.

* * * * *